US008773367B2

(12) United States Patent
Han

(10) Patent No.: US 8,773,367 B2
(45) Date of Patent: Jul. 8, 2014

(54) MULTI-POINT TOUCH SCREEN AND TOUCH DETECTION METHOD

(76) Inventor: DingNan Han, Beijing (CN)

( * ) Notice: Subject to any disclaimer, the term of this patent is extended or adjusted under 35 U.S.C. 154(b) by 574 days.

(21) Appl. No.: 12/666,296

(22) PCT Filed: Feb. 17, 2009

(86) PCT No.: PCT/CN2009/000160
§ 371 (c)(1),
(2), (4) Date: Jul. 1, 2010

(87) PCT Pub. No.: WO2009/103219
PCT Pub. Date: Aug. 27, 2009

(65) Prior Publication Data
US 2010/0277426 A1  Nov. 4, 2010
US 2011/0141033 A2  Jun. 16, 2011

(30) Foreign Application Priority Data

Feb. 19, 2008  (CN) .......................... 2008 1 0007915
Aug. 11, 2008  (CN) .......................... 2008 1 0147355

(51) Int. Cl.
*G06F 3/041* (2006.01)
*G06F 3/042* (2006.01)
*G06F 3/043* (2006.01)

(52) U.S. Cl.
CPC ............ *G06F 3/0436* (2013.01); *G06F 3/0421* (2013.01)
USPC ........ 345/173; 345/175; 345/177; 178/18.04; 178/18.09

(58) Field of Classification Search
USPC ......... 345/173–179; 178/18.01–18.09, 18.11, 178/19.01–19.07
See application file for complete search history.

(56) References Cited

U.S. PATENT DOCUMENTS

| 4,393,268 | A  | * | 7/1983  | Guedj et al. ............... 178/18.04 |
| 7,145,552 | B2 | * | 12/2006 | Hollingsworth ............. 345/168 |
| 2005/0248548 | A1 | * | 11/2005 | Tsumura et al. .............. 345/177 |
| 2008/0150902 | A1 | * | 6/2008  | Edpalm et al. ................ 345/173 |
| 2009/0244026 | A1 | * | 10/2009 | Purdy et al. ................... 345/174 |

FOREIGN PATENT DOCUMENTS

WO       WO 0235460 A1 * 5/2002

* cited by examiner

*Primary Examiner* — Stephen Sherman

(57) ABSTRACT

A multi-point touch screen suitable for a mobile apparatus is disclosed, which can output accurate touch images of a touch region by scanning, line by line, the touch region via an induction region positioned below the touch region. A method for detecting the occurrence of touch is characterized in that variations of rays are detected to determine the occurrence of touch, such variations are caused by the fact that media propagated by the rays response to variation of an electric field, and the variation of the electric field results from approaching of a conductor or an electrified body.

12 Claims, 5 Drawing Sheets

MULTI-POINT TOUCH SCREEN AND TOUCH DETECTION METHOD

FIELD OF THE INVENTION

The invention relates to touch detection, in particular to a method for the detection of touch by detecting variation of physical properties of piezoelectric material or structure generated in response to variation of electric field and a touch screen employing the method.

BACKGROUND OF THE INVENTION

The present touch screen techniques that are applied to portable electronic products and can realize the touch image output in touch region are: projected capacitive touch screen technology, and optical touch screen technology integrated with a photosensitive module in a liquid crystal panel.

SUMMARY OF THE INVENTION

The invention provides a touch panel, in its touch region, by use material or structure physical properties of which are varied along with the variation of electric field, to transduce the variation of the electric field which is the result from touch into other physical changes. In further, by load the physical change into ray such as light wave or acoustic wave, to get the high Signal-to-Noise and low cost.

When a conductor or an electrified body approaches to an alternative electric field, the alternative electric field will be impacted, so as to impact on acoustic waves sent by piezoelectric material or structure that is positioned therein and driven by the alternative electric field, the piezoelectric material or structure sends the acoustic waves that are deformable with respect to the situation in which no conductor or electrified body approaches to the alternative electric field. Detecting the acoustic waves can confirm occurrence of the touch.

When the conductor or the electrified body approaches to the electric field, the electric field will be impacted, so as to impact on physical properties of material or structure the physical properties of which are impacted by the electric field. The variation of the physical properties of the material or structure can impact on rays passing therethrough such as acoustic wave or light, so that the acoustic wave or the light varies with respect to the situation in which no conductor or electrified body approaches to the electric field. Detecting the variations of the rays can confirm occurrence of the touch.

The invention provides a method for detecting occurrence of the touch, characterized by detecting deformable acoustic waves sent by the piezoelectric material or structure in the electric field, which is caused by the variations of the electric field when the conductor or the electrified body approaches to the electric field.

The invention provides a method for detecting occurrence of the touch, characterized by detecting the variations of the rays in order to confirm occurrence of the touch, such variations are resulted from media propagated by the rays in response to the variations of the electric field, and the variations of the electric field are resulted from approaching of the conductor and the electrified body.

The invention provides a touch panel, characterized by comprising, in a touch region, one or multiple of the group consisting of an acoustic grating layer, an optical grating layer and an electroacoustic transducing layer.

BRIEF DESCRIPTION OF THE DRAWINGS

For a better understanding of the detailed description of the invention, reference is made in conjunction with the following drawings, wherein.

Figure 1:
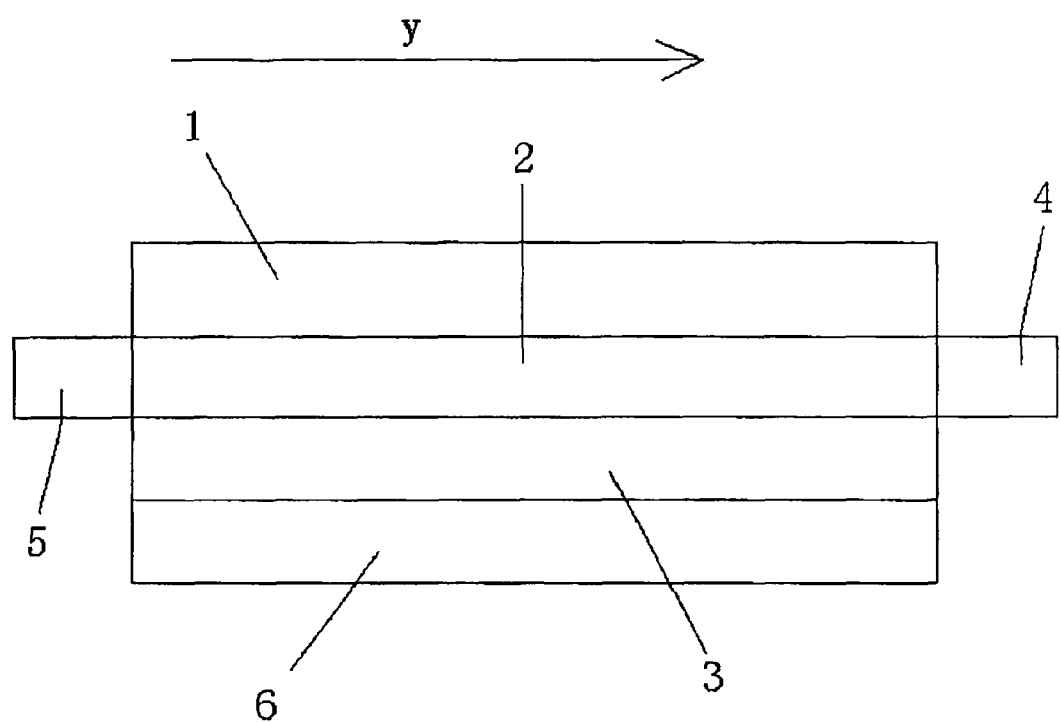
FIG. 1 is a lateral view that illustrates the touch panel, in accordance with the first embodiment of the invention.

It should be understood that contents, which are shown in the drawings, are diagrammatic and are not scaled.

DETAILED DESCRIPTION OF THE EMBODIMENT

The first embodiment is based on a more advanced schema, amplify touch signal at touch region, so it is fit for the case which need large size screen and very high sensitivity. The second embodiment is based a simpler schema, fit for normal case.

FIG. 1 is a lateral view that illustrates the touch panel, in accordance with the first embodiment of the invention. The FIG. 1 comprises: an upper glass substrate 1; an acoustic grating layer 2 comprising transparent piezoelectric material; a drive electrode layer 3, drive electrodes of which are parallel to an axis x, are arrayed equidistantly along an axis y and are mutually insulating; an acoustic wave generator 4 sending acoustic waves in a direction parallel to the axis y; an acoustoelectric transducer array 5 in which acoustoelectric transducer units are arrayed equidistantly along the axis x; and a lower glass substrate 6 playing a role of supportive protection.

During the operation of a screen, the acoustic wave generator sends the acoustic wave and the drive electrodes operate sequentially to drive the acoustic grating layer thereon to vary. When the conductor or the electrified body approaches, impact is applied to the electric field to which the acoustic grating is subjected, in order to vary oscillation condition or status of the acoustic grating and to vary the acoustic grating-passing acoustic wave with respect to the situation in which no conductor or electrified body approaches. A system receives and records acoustic signals that are received by reception units of the acoustoelectric transducer array. All the regions of the acoustic grating layer are driven once during an entire operation period.

Figure 3:
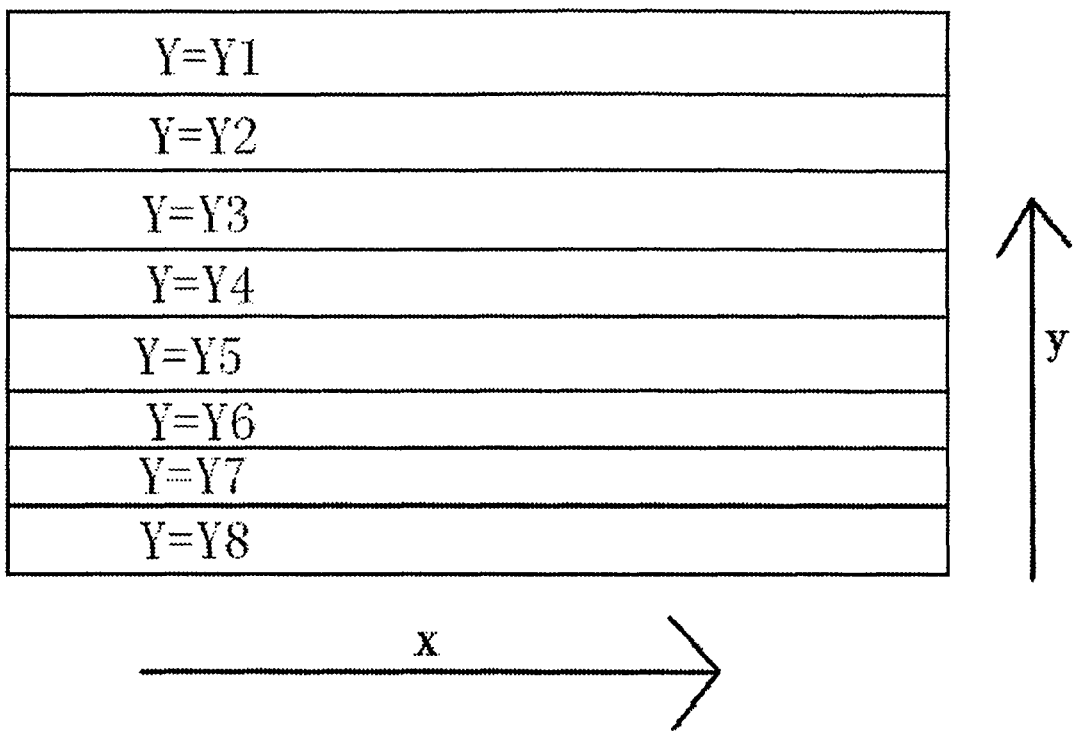
FIG. 3 is a partitioning diagrammatic sketch of a plurality of regions to which the acoustic grating layer is partitioned according to y coordinate, shown in the FIG. 2.

In order to achieve high refresh rate, a plurality of equidistant regions of the acoustic grating layer can be operated simultaneously. FIG. 3 is taken for example, Y=Y1, Y=Y3, Y=Y5, Y=Y7 are grouped while Y=Y2, Y=Y4, Y=Y6, Y=Y8 are grouped. The regions of the acoustic grating layer in each group operate simultaneously to determine the regions of the acoustic grating layer corresponding to the acoustic waves in accordance with time periods the acoustic waves arrive at the acoustoelectric transducer.

Figure 2:
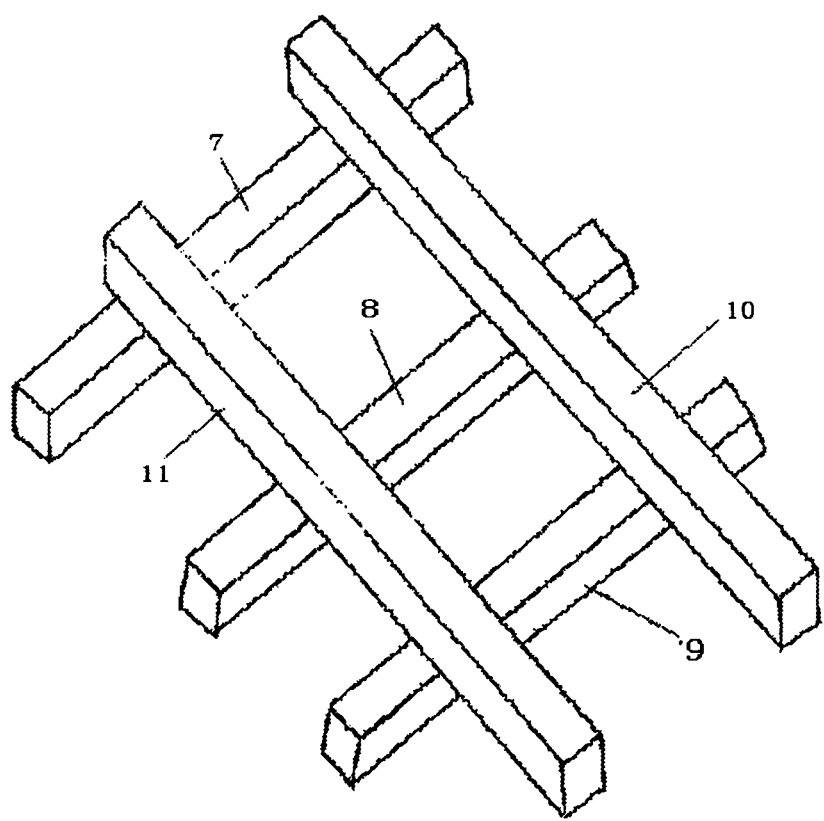
FIG. 2 is a structure of the acoustic grating layer, in accordance with the first embodiment of the invention.

In order to accurately control each acoustic grating, a method for driving the acoustic grating in the same region by a plurality of drive electrodes can be employed. For example, the structure shown as the FIG. 2 can be employed, comprising: the driving electrodes 7, 8 and 9; the acoustic gratings 10 and 11 made of the transparent piezoelectric material, materials such as optical gel or resin are filled between the acoustic gratings 10 and 11. When the touch screen operates, the acoustic waves pass through the acoustic gratings 10 and 11.

The drive electrodes 7 and 8 operate as one group and the drive electrodes 8 and 9 operate as another group, controlling the regions of the acoustic grating between two electrodes in each group. It is attentive that the acoustic grating layer is not likely to use grating structure, and if permissible, the whole material or other structure is appropriate.

By taking FIG. 3 for example, the acoustic grating layer is partitioned into a plurality of regions by different drive electrodes or drive electrode groups in accordance with y coordinate, comprising work processes as below:

Step 1: the acoustic wave generator sends the acoustic wave when starting operation. The acoustic wave of the acoustic wave generator reaches the acoustoelectric transducer, the acoustoelectric transducer array operates, and the system records acoustic signals received by each acoustoelectric transducer unit at this moment.

Step 2: the acoustic gratings of Y=Y1, Y=Y3, Y=Y5, Y=Y7 regions in the y coordinate start operating under the driving of the drive electrodes. When the acoustic gratings start operating and the acoustic wave of Y=Y1 region reaches Y=Y3 region, the acoustic gratings stop operating. The acoustoelectric transducer receives acoustic signals. The system determines the acoustic grating region corresponding thereto in accordance with time period the acoustic wave reach. The system determines x coordinate of the acoustic wave corresponding to the acoustic wave region in accordance with the acoustoelectric transducer unit of the received acoustic wave. By comparing the acoustic signal with the acoustic signal obtained in the step 1, distribution maps of variations of the acoustic signals of Y=Y1, Y=Y3, Y=Y5, Y=Y7 regions are obtained.

Step 3: the Y=Y2, Y=Y4, Y=Y6, Y=Y8 regions start operating, and step 1 and step 2 are repeated until all the regions of the acoustic grating layer are driven once, thus obtaining the distribution maps of variations of the acoustic signals in each region.

Step 4: the distribution maps of variations of the acoustic signals of each region are spliced to obtain the distribution map of variations of the acoustic signals corresponding to the entire touch region.

Step 5: the distribution map of variations of the acoustic signals corresponding to the entire touch region is noise-reduced and then identified in order to obtain occurrence situation of touch on the touch region.

All the steps described hereinabove are an entire operating period. When the acoustic gratings start operating and the acoustic wave of Y=Y1 region reaches Y=Y3 region, the acoustic gratings stop operating, which aims at preventing the acoustic waves from repeatedly entering the acoustic grating regions in operating status, and meanwhile, increasing the acoustic waves passing through the acoustic grating regions in operating status as much as possible, in order to provide more accurate and entire signals. When the operation-stopping time of the acoustic grating can not be controlled accurately, the operating stopping of the acoustic grating can be appreciably advanced. If the operating stopping of the acoustic grating is advanced, when the acoustoelectric transducer receives the acoustic wave, an acoustic wave without passing through the acoustic grating in operating status is present each period of time, and the system can remove the acoustic wave by comparing the acoustic wave with the acoustic signal in the step 1. Since the time period when the acoustic wave without passing through the acoustic grating in operating status reaches the acoustoelectric transducer can be computed, the system can remove the acoustic wave in accordance with the time period when the acoustic wave reaches the acoustoelectric transducer.

As the light, which passes through the material or the structure physical properties of which are impacted by the electric field, is also impacted, the touch can be determined by detecting light waves received by a photoelectric transducer. Because of the great speed of light, the optical gratings in only one region operate each time in embodiments employing the optical grating structure.

Figure 4:
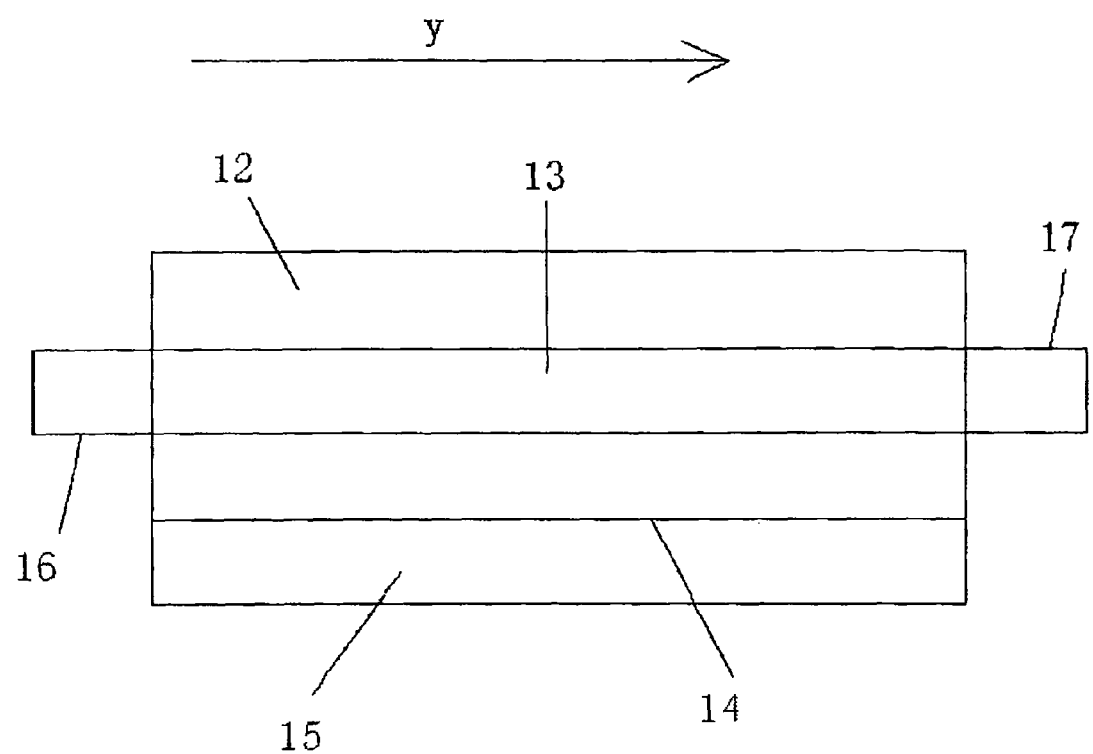
FIG. 4 is a lateral view that illustrates a deformed touch panel, in accordance with the first embodiment of the invention.

FIG. 4 is a lateral view that illustrates a deformed touch panel, in accordance with the first embodiment of the invention. The FIG. 4 comprises an upper substrate 12; an optical grating layer 13 made of transparent piezoelectric material; a drive electrode layer 14; a lower substrate 15; a photoelectric transducer array 16; and an infrared/ultraviolet ray generator 17.

The piezoelectric material in the embodiment can be replaced by material or structure physical properties of which are impacted by the electric field so as to vary lights or acoustic waves passing therethrough.

Locations of the acoustic grating/optical grating layers and the drive electrode layer can be mutually exchanged.

Figure 5:
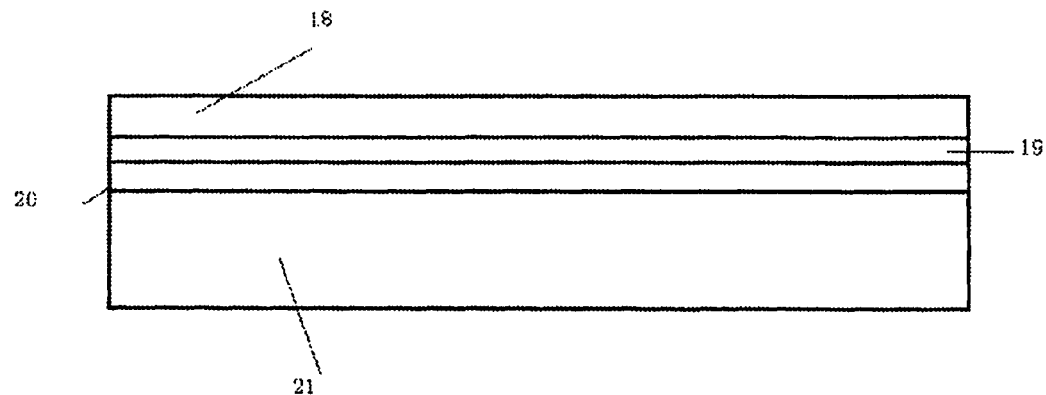
FIG. 5 is a lateral view that illustrates the touch region, in accordance with the second embodiment of the invention.

FIG. 5 is a lateral view that illustrates the touch region, in accordance with the second embodiment of the invention. The FIG. 5 comprises an upper substrate 18 playing a role of protection; an electroacoustic transducing layer 19; a drive electrode layer 20; and a lower substrate 21. The drive electrodes are parallel to the axis x, are mutually insulating and are arrayed equidistantly and evenly in accordance with y coordinate. For example, when approaching or touch to the screen, fingers of human disturb the alternative electric field nearby so as to vary acoustic waves sent by the electroacoustic transducing layer, the acoustoelectric transducer positioned at the edge of the screen compares the received varied acoustic wave with reference waveform without touch in order to determine the touch. If the x coordinate of the regions of the electroacoustic transducing layer corresponding to the received acoustic wave is determined in accordance with a method of sound ranging, such as the method used in the second embodiment, the acoustoelectric transducer shall be positioned at the edge of the screen vertical to the drive electrode. If the x coordinate of the regions of the electroacoustic transducing layer corresponding to the received acoustic wave is determined by means of the acoustoelectric transducer unit that receives the acoustic wave, such as the method used in the first embodiment, the acoustoelectric transducer shall be positioned at the edge of the screen parallel to the drive electrode. The regions on the screen, which have different y coordinates, are driven by the relative drive electrodes parallel to the axis x. During an operating period of the multi-point touch screen, each drive electrode operates once to drive relative parts of the acoustoelectric transducer to sent acoustic waves. Within the operating interval of the electrodes, it should be guaranteed that all the acoustic waves sent by the electroacoustic transducing layer driven by each electrode reach the acoustoelectric transducer.

Figure 6:
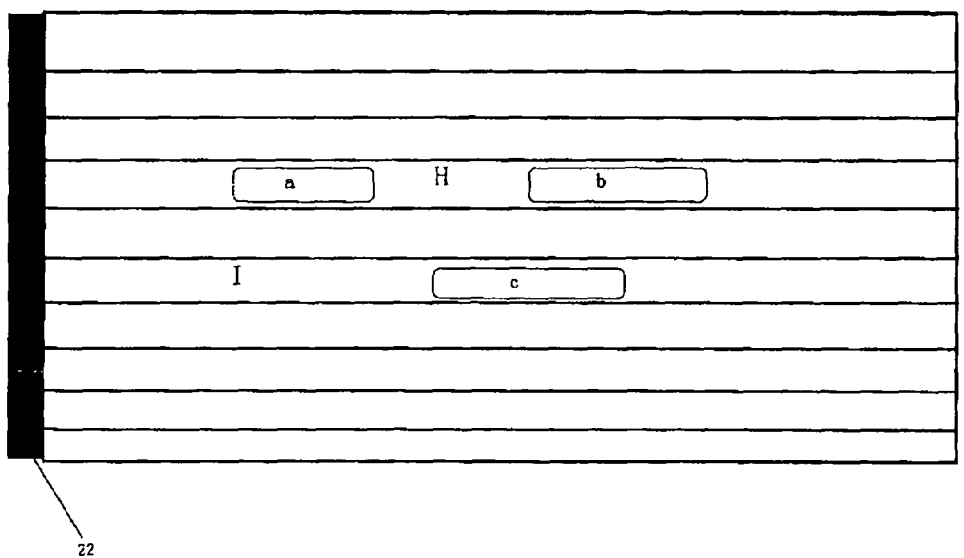
FIG. 6 is a touch diagrammatic sketch of the touch region, in accordance with the second embodiment of the invention.

FIG. 6 is a touch diagrammatic sketch of the touch region, in accordance with the second embodiment of the invention. The FIG. 6 comprises an acoustoelectric transducer 22, it at the edge of the touch panel, not include in touch region. In the embodiment, the electroacoustic transducing layer is partitioned into a plurality of regions by different drive electrodes in accordance with the y coordinate. Workflow of touch detection by the touch screen is now made to description with reference to FIG. 6.

Step 1, at certain operation time of the multi-point touch screen, under the driving of the electrodes, the electroacoustic transducing layer in region H stops after operating for a while, the operating duration is a period of the sent acoustic waves.

Step 2, after all the acoustic waves sent by the electroacoustic transducing layer in the region H reach the acoustoelectric transducer, the touch screen system determines the acoustic wave-sending region in accordance with the time the acoustic waves reach. x coordinate of points on the electroacoustic transducing layer, corresponding to the acoustic wave at each time is determined by reaching time of the acoustic waves and time difference between the reaching time and the operation-starting time of the drive electrode in the acoustic wave-sending region, thus obtaining acoustic wave signals corresponding to points in the region. The regions of the next electroacoustic transducing layer start operating under the driving of the electrodes.

Step 3, the acoustic wave signals corresponding to the points in other regions are determined in accordance with the method for determining the acoustic wave signals corresponding to the points in the region H in step 1 and step 2.

Step 4, a diagram corresponding to variations of the acoustic wave signals of each point is obtained by comparing the acoustic waves received by the acoustoelectric transducer with the acoustic waves in each region when no touch is applied to the screen, in accordance with the variations of the acoustic wave signals of each point.

Step 5, the diagrams generated by the regions are spliced to obtain the diagram of the entire screen.

Step 6, the diagram of the entire screen is noise-reduced to obtain the noise-reduced diagram, Step 7, the noise-reduced diagram is identified via relative algorithm to determine coordinates of each touch point.

In accordance with the preferable embodiment of the invention, if response time of the touch screen needs to be shortened, the method in which two or multiple regions of the electroacoustic transducing layer sending acoustic waves with different frequencies operate simultaneously is used to frequency-separate the acoustic wave signals received by the acoustoelectric transducer, process the acoustic waves in two or multiple regions respectively, and generate distribution maps of the acoustic wave signals sent by points in the two or multiple regions, thus prominently increasing response speed.

In accordance with the preferable embodiment of the invention, the method in which two or multiple regions of the electroacoustic transducing layer send acoustic waves with different frequencies comprises, but is not limited to, for example, the drive electrodes in two or multiple regions send excitation signals with different frequencies; or one drive electrode can be shared by two or multiple regions, however, the two or multiple regions are made of piezoelectric materials having different resonance frequencies.

In the invention, basic signals without the occurrence of touch, which are used for comparison, can be obtained by one or more of three methods including system initialization, recording of a receiver upon non-operation of the drive electrodes and system auto-calibration on condition of no touch object for sure.

In the invention, in order to enable rays such as acoustic wave or light to enter a transmitting medium and a reception device with low loss, a corresponding anti-reflection layer can be used. For example, in the embodiment 1, the anti-reflection layer can be added between the acoustic wave/optical wave generator and the transmitting medium, such as between the acoustic grating layer and the acoustic wave generator, and between the receiver and the transmitting medium. The anti-reflection layer can be formed by superposing a plurality of materials that have different conducting coefficients with respect to the rays for detection.

The acoustic grating/optical grating layer can employ the whole piece of material or structure and the whole piece of single material, mixed material of the whole piezoelectric material and other material, especially the mixed material of resin and piezoelectric material, particles of the piezoelectric material are doped/scattered/embedded into a substrate of certain material, the acoustic grating/optical grating layer can simultaneously employ a plurality of piezoelectric materials, mixed material of a plurality of piezoelectric materials, and can also employ other material or structure physical properties of which are varied along with the variation of external electric field. The acoustic grating/optical grating layer is to define functions but not structure, namely, a structure has the function of impacting on, under the effect of external electric field, acoustic waves or lights that pass therethrough.

The acoustic grating/optical grating layer can be manufactured by spraying on the substrate, by bonding, rolling and throwing with other structure after being manufactured individually, or by multiple methods in the plurality of processes described hereinabove. For example, the substrate is formed by spray-coating/rolling/bonding, and then the material is scattered. The manufacture process described herein is exemplary and is not considered to be restrictive content.

It should be understood that the invention is described by using piezoelectric material as the preferable embodiment. It should be understood that the piezoelectric material can also be replaced by material or structure physical properties of which are varied along with the variation of external electric field. For example, physical properties of a structure constructed based on electromagnetic principle also response to the variations of the electric field under the effect of magnetic field force of the electric field.

It should be understood that the invention is described by using Cartesian rectangular coordinate system based on x, y two-dimensional coordinates and using equidistantly-arrayed drive electrodes as the preferable embodiment. It should be understood that the Cartesian rectangular coordinate system can also be replaced by other coordinate systems, and the drive electrodes are not necessarily to be arrayed equidistantly in consideration of electric performances and the like. For example, the acoustic wave generator can be positioned in the center of the screen, and an annular polar coordinate system is used, which means the drive electrodes are arrayed annularly.

It should be understood that the invention is detailed by taking sound and light for example, however, the applicable rays are not limited to sound and light, x-ray and electromagnetic waves in other frequency bands can be used in cooperation with relative material or structure. The electric field-impacting physical properties of the used material or structure can only impact on the rays that pass through the material.

It should be understood that the preferable embodiment is detailed in the invention by using nonbreakable glass as substrate. However, the substrate of the invention is not limited to nonbreakable glass or insulating material. It is understandable to the skilled in the art that anisotropic material with certain strength can also be used as the substrate of the invention.

It should be understood that the material physical properties of which are impacted by electric field in the invention, for example, the acoustic grating layer described in the preferable embodiment, uses grating structure as the preferable embodiment, but the usage is not limited to grating structure. Various structures can be used for materials impacted by the electric field in accordance with actual situation and requirements, such as a whole piece of piezoelectric material and spherical piezoelectric material.

It should be understood that the preferable embodiment of the invention uses, but is not limited to, a strip-shaped ray reception device and a strip-shaped transmission device that are parallel to the edges of the screen. In accordance with different requirements and used coordinate systems, the reception device or transmission device can be arranged in any form, such as spotted form or annular form.

The reason why the conductor can be detected by the method for detecting the occurrence of touch, which is provided by the invention, is that the conductor impacts on electromagnetic ambience nearby. Therefore, approaching of substances that can impact on the electromagnetic ambience nearby can be detected by the touch method provided by the invention. For example, attaching charge to an insulator makes the insulator detectable. Such a method is still considered to be the embodiment within the scope of attached claims.

It is understandable to the skilled in the art that the touch panel according to the invention can be combined into various electronic products that include, but are not limited to: integration with display, panel computer, personal computer, writing board, fingerprint identifier, music play product, digital telephone, PDA, digital image record product, GPS locator, digital video/image play product and digital frame. In the same way, the method for detecting the occurrence of touch according to the invention can be applied to various electronic products.

Each representative embodiment described herein is represented in exemplary way instead of restrictive way. In the invention, equivalence and replaceability of sound and light as well as various rays are repeatedly emphasized. It will be understood by the skilled in the art that various changes in the form and details may be made to the embodiments described therein with resulting in equivalent embodiments that are considered to be within the scope of attached claims.

The invention claimed is:

1. A touch panel which can detect touch input and report the situation of the touch to a system, the touch panel comprising:
    a touch region that detects touch by detecting variation of electric fields generated in response to the approaching of a conductor or an electrified body, the touch region comprising:
    driving electrodes that are driven to generate electric field; and
    material or structure, the physical properties of which are affected by electric field and are able to generate physical changes, other than both movement of electric charge and variation of electric field, in response to the variation of electric field,
    wherein the stated physical change generated by the stated material or structure in response to the variation of electric field is used for the stated touch detection.

2. The panel according to claim 1, characterized in that, detects touch by detecting the stated physical change of the stated material or structure in the touch region generated in response to variation of electric field.

3. The panel according to claim 2, characterized in that, the stated material or structure in the touch region is piezoelectric material or structure.

4. The panel according to one of claim 1, claim 2, claim 3, characterized in that, in accordance with the principle of one identical coordinate in a two-dimensional coordinate system, the touch region is partitioned into a plurality of regions with each region can individually work.

5. A touch panel which can detect touch input and report the situation of the touch to a system, characterized by one of below:
    A touch region that detects touch by detecting variation of electric fields generated in response to the approaching of a conductor or an electrified body, the touch region comprising driving electrodes that are driven to generate electric field, and using acoustic wave or optical wave or infrared ray or ultraviolet ray or other rays in the touch region, according to variation of acoustic wave or optical wave or infrared ray or ultraviolet ray or other rays of the touch region to detect variation of electric fields of the touch region so as to detect the touch;
    A touch region that detects touch by detecting variation of electric fields generated in response to the approaching of a conductor or an electrified body, the touch region comprising driving electrodes that are driven to generate electric field, and the touch panel using an acoustic wave generator or a light wave generator or an infrared ray generator or an ultraviolet ray generator or an acoustic wave receiver or a light wave receiver or an infrared ray receiver or an ultraviolet ray receiver or other rays receiver or generator, according to variation of acoustic wave or optical wave or infrared ray or ultraviolet ray or other rays of the touch region to detect variation of electric fields of the touch region so as to detect the touch.

6. The panel according to claim 5, characterized by the acoustic wave receiver or the light wave receiver or the infrared ray receiver or the ultraviolet ray receiver or other rays receiver transduce the ray into electrical signal.

7. The panel according to claim 5, characterized in that the touch region comprises one or more of an acoustic grating layer, an optical grating layer, an electroacoustic transducing layer.

8. A panel which can detect touch input on its touch region and report the situation of the touch to a system, characterized by using acoustic wave or optical wave or infrared ray or ultraviolet ray or other rays in the touch region, the touch region comprising driving electrodes that are driven to generate electric field, and in the touch region comprising material or structure physical properties of which are affected by electric field, and according to variation of acoustic wave or optical wave or infrared ray or ultraviolet ray or other rays of the touch region to detect variation of electric fields of the touch region so as to detect the touch.

9. The panel according to one of claim 2, claim 6, claim 7, claim 8, characterized in that, in accordance with the principle of one identical coordinate in a two-dimensional coordinate system, the touch region is partitioned into a plurality of regions with each region being individually detectable.

10. The panel according to claim 9, characterized by identifying each region of the touch region in accordance with one or more of the following methods:
    in accordance with different frequencies of acoustic waves;
    in accordance with different operating time periods;
    in accordance with different receiver units;
    in accordance with different time periods the acoustic waves or the light waves reach the receivers.

11. The panel according to claim 9, characterized in that a plural regions of touch region operate at the same time.

12. An electronic product, comprising the panel according to one of claim 1, claim 5, claim 6, claim 7, claim 8, claim 3.

* * * * *